(12) United States Patent
Kumar et al.

(10) Patent No.: US 8,323,591 B2
(45) Date of Patent: Dec. 4, 2012

(54) METHOD OF FABRICATING A MIXING CHAMBER AND A REACTOR RELATING THERETO

(75) Inventors: Sailesh B. Kumar, Naperville, IL (US); Robert L. Bunting, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 110 days.

(21) Appl. No.: 13/091,946

(22) Filed: Apr. 21, 2011

(65) Prior Publication Data
US 2012/0269699 A1    Oct. 25, 2012

(51) Int. Cl.
  *B01J 8/04* (2006.01)
  *B01J 8/00* (2006.01)
  *B01J 19/00* (2006.01)
(52) U.S. Cl. ........ 422/647; 422/129; 422/600; 422/630; 422/644; 366/197; 366/341
(58) Field of Classification Search .................. 422/129, 422/600, 630, 644, 647; 366/197, 208, 209, 366/216, 241, 242, 336; 261/108
See application file for complete search history.

(56) References Cited

U.S. PATENT DOCUMENTS

| | | |
|---|---|---|
| 2,775,542 A | 12/1956 | Carver |
| 2,791,536 A | 5/1957 | Saxton |
| 2,791,538 A | 5/1957 | Felix |
| 3,541,000 A | 11/1970 | Hanson et al. |
| 3,592,612 A | 7/1971 | Ballard et al. |
| 4,126,539 A | 11/1978 | Derr, Jr. et al. |
| 4,268,484 A | 5/1981 | Gavin |
| 4,696,575 A | 9/1987 | Upmeier |
| 4,836,989 A | 6/1989 | Aly et al. |
| 4,909,967 A | 3/1990 | Binkley et al. |
| 4,937,051 A | 6/1990 | Graven et al. |
| 5,232,283 A | 8/1993 | Goebel et al. |
| 5,423,981 A | 6/1995 | Krieger |
| 5,462,719 A | 10/1995 | Pedersen et al. |
| 5,534,233 A | 7/1996 | Yamamoto et al. |
| 5,635,145 A | 6/1997 | Den Hartog et al. |
| 5,690,896 A | 11/1997 | Stangeland et al. |
| 5,837,208 A | 11/1998 | Grott et al. |
| 5,935,413 A | 8/1999 | Boyd et al. |
| 6,969,495 B1 | 11/2005 | Hotier et al. |
| 7,045,103 B2 | 5/2006 | McDougald et al. |
| 7,288,200 B1 | 10/2007 | Hotier et al. |

FOREIGN PATENT DOCUMENTS

GB    1 349 805    4/1974

*Primary Examiner* — Walter D Griffin
*Assistant Examiner* — Natasha Young
(74) *Attorney, Agent, or Firm* — James C Paschall

(57) ABSTRACT

One exemplary embodiment can be a method of fabricating a mixing chamber in a hydroprocessing reactor. The method can include providing a first section forming an opening and coupling a second section including a sidewall to the first section. The second section forms a flange for coupling the mixing chamber and facilitating the mixing of one or more fluids.

20 Claims, 3 Drawing Sheets

METHOD OF FABRICATING A MIXING CHAMBER AND A REACTOR RELATING THERETO

FIELD OF THE INVENTION

This invention generally relates to a method of fabricating a mixing chamber and a reactor relating thereto.

DESCRIPTION OF THE RELATED ART

The quench zone internals in a hydroprocessing reactor can distribute quench gases for removing heat and mixing the liquid phase to reduce differences in concentration and temperature. Typically, a mixing box can enhance liquid mixing and often is a cylindrical vessel with a short aspect ratio. The mixing box can span about 80-about 90% of the reactor diameter and typically can have a radius of about 1-about 2 meters. The height of the mixing box can be about 0.3 meters, and as a consequence, the mixing box tends to be a rather shallow vessel.

This shallow depth as well as its diameter can create difficulties in handling and installing the vessel within the reactor. Sometimes, the mixing box can be inserted as pieces into a reactor and fastened together with brackets on the exterior of the mixing box. A seal can be provided between the pieces. However, the external brackets fail to facilitate blending of the phases within the mixing box.

SUMMARY OF THE INVENTION

One exemplary embodiment can be a method of fabricating a mixing chamber in a hydroprocessing reactor. The method can include providing a first section forming an opening and coupling a second section including a sidewall to the first section. The second section forms a flange for coupling the mixing chamber and facilitating the mixing of one or more fluids.

Another exemplary embodiment may be a mixing chamber. The mixing chamber may include a first section forming an opening surrounded by a weir, a second section coupled to the first section forming a first seam, and a third section coupled to the first and second sections forming a second seam with the second section. Typically, a baffle is formed along the second seam for promoting mixing of one or more fluids therein.

Yet another exemplary embodiment can be a reactor. Generally, the reactor includes a first catalyst bed, a collection tray positioned underneath the first catalyst bed, and a mixing chamber. Usually, the mixing chamber includes a first section forming an opening surrounded by a weir, second section coupled to the first section forming a first seam, and a third section coupled to the first and second sections forming a second seam with the second section. Typically, the second and third sections further include respective flanges along the second seam.

The embodiments provided herein can permit the relatively simple and efficient installation of a mixing chamber within a hydroprocessing reactor. Particularly, the mixing chamber can include a plurality of sections that can be positioned within the reactor and then fabricated therein. Generally, the sections can be sealed with a gasket that maintains the fluid integrity of the mixing chamber. Additionally, the assembled mixing chamber can form one or more flanges at predetermined locations to enhance mixing.

DEFINITIONS

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a bolt and nut, a nail, a staple, or a rivet; an adhesive; or a solder.

As used herein, the term "fluid" can mean a liquid or a gas.

As used herein the term "fluids" can mean one or more liquids and/or gases.

As used herein, the term "vapor" can mean a gas or a dispersion that may include or consist of one or more hydrocarbons.

As used herein, the term "glass fibers" can include one or more oxides of aluminum, silicon, alkali, and alkaline earth metals. Exemplary glass fibers may include oxides of aluminum and silicon and may be sold under the trade designation THERMAL CERAMICS®. Such glass fibers are available from commercial sources, such as The Morgan Crucible Company PLC of Windsor, United Kingdom.

As used herein, the term "flange" can mean a projecting member from a section that may be coupled to another flange or body.

As used herein, the term "baffle" can mean an obstructing device for a flow of a fluid and may include a plurality of flanges coupled together.

DETAILED DESCRIPTION

Figure 1:
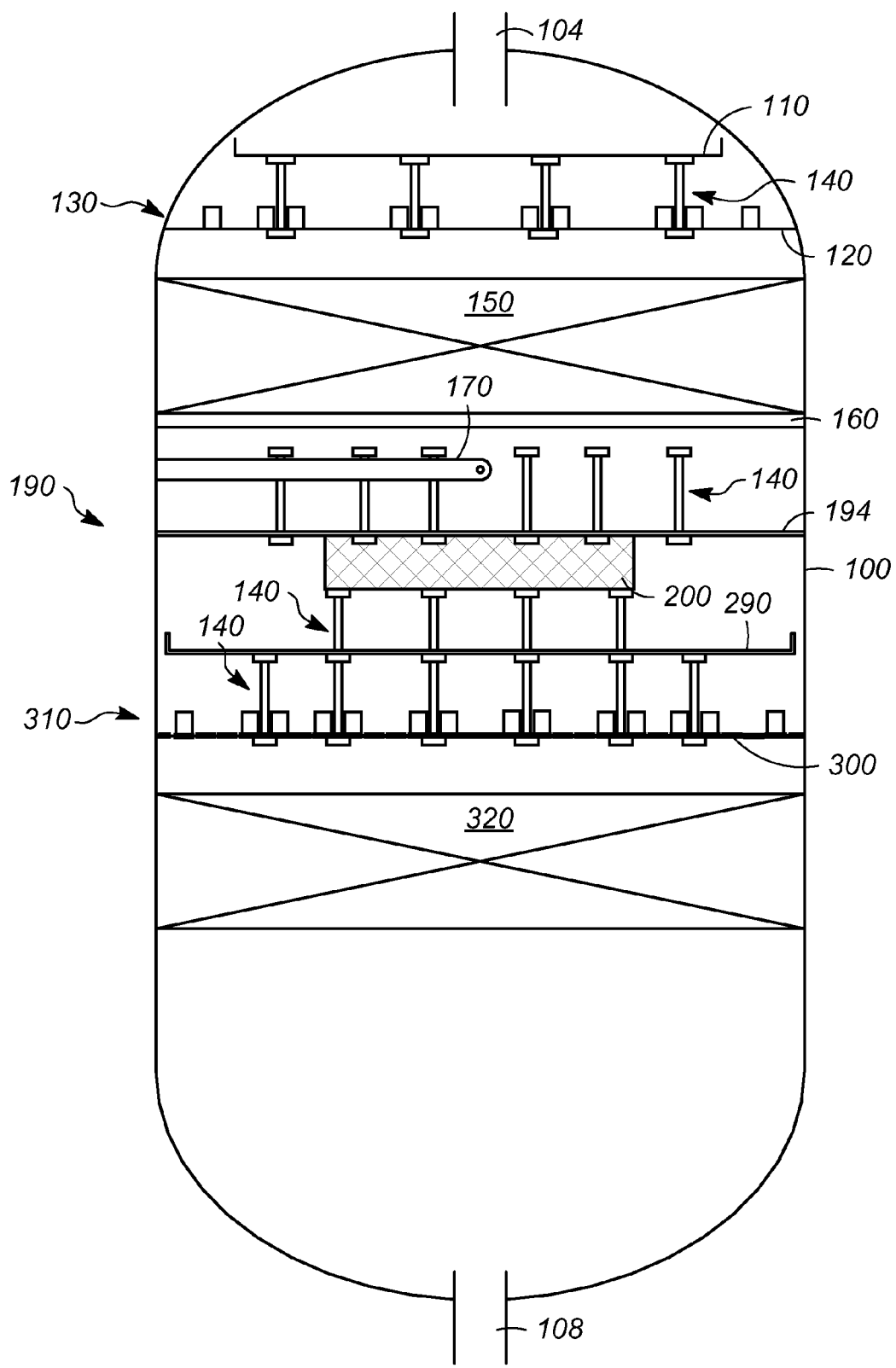
FIG. 1 is an elevational, schematic cross-sectional view of an exemplary vessel.

Referring to FIG. 1, an exemplary vessel or reactor 100 can include an inlet 104 and an outlet 108. Furthermore, the vessel 100 can include a first distribution tray or rough distribution tray 110, a second distribution tray or redistribution tray 120, a plurality of downcomers 130, a series of plates or baffles 140 at various elevations, a first catalyst bed 150, a quenching or mixing zone 190, and a second catalyst bed 320. Generally, the vessel or reactor 100 can be any suitable hydroprocessing reactor, such as disclosed in, e.g., U.S. Pat. No. 4,937,051. Typically, the vessel 100 can contain the quenching or mixing zone 190 between the first and second catalyst beds 150 and 320. Although two catalyst beds 150 and 320 are depicted, it should be understood that any number of catalyst beds can be used with optionally corresponding quenching or mixing zones positioned between.

The first distribution tray 110 can be coupled to the second distribution tray 120 by a series of plates or baffles 140 using any suitable means such as mechanical fasteners. The plurality of downcomers 130 can form tubes and be positioned within holes in the second distribution tray 120. Generally, incoming fluids passing through the inlet 104 can be distributed through the plurality of downcomers 130 past the second distribution tray 120. Although ten downcomers 130 are depicted, it should be understood that any suitable number of downcomers 130 may be utilized. The downcomers 130 can be positioned uniformly or unevenly on the second distribution tray 120.

Afterwards, the one or more fluids, such as a vapor and a liquid, can pass through the first catalyst bed 150 supported by a catalyst support tray 160. Generally, the reactants can produce products that fall downward. Typically, the catalyst support tray 160 has openings therein for allowing fluids to pass there-through.

The quenching or mixing zone 190 can include a quench distributor 170, a series of plates or baffles 140, a collection tray 194 forming at least one spillway, a chamber or mixing chamber 200, a first distribution tray or rough distribution tray 290, a second distribution tray or redistribution tray 300, and a plurality of downcomers 310. Although fourteen downcomers 310 are depicted, it should be understood that any suitable number of downcomers 310 may be utilized. In other exemplary embodiments, the downcomers 310 can be positioned uniformly or unevenly on the second distribution tray 300.

Usually, the first distribution tray 290 and the second distribution tray 300 can be coupled together with a series of plates or baffles 140 using any suitable means such as welds or mechanical fasteners. Similarly, the mixing chamber 200 can be coupled to the first distribution tray 290 and the collection tray 194 utilizing any suitable means, such as the plates or baffles 140 in any suitable manner, such as welds or mechanical fasteners.

Generally, one or more fluids, which can be a liquid and a vapor, enter the inlet 104. The one or more fluids can pass through the trays 110 and 120 and into the first catalyst bed 150. After undergoing reactions, the one or more fluids exiting the first catalyst bed 150 can be quenched with a fluid, typically a gas, provided by the quench distributor 170. Again, the vapor through can pass through spillways, not depicted, in the collection tray 194 while the liquid can collect therein. The spillways can be raised to allow liquid collection prior to overflowing through one or more spillways in the collection tray 194 into the mixing chamber 200 along with the vapor. The liquid and vapor mix to even out inconsistencies in the temperature and composition. Next, the one or more fluids exiting the bottom of the mixing chamber 200 can pass through the trays 290 and 300 to the second catalyst bed 320 below. Afterwards, the one or more products can exit the second catalyst bed 320 via the outlet 108.

Figure 2:
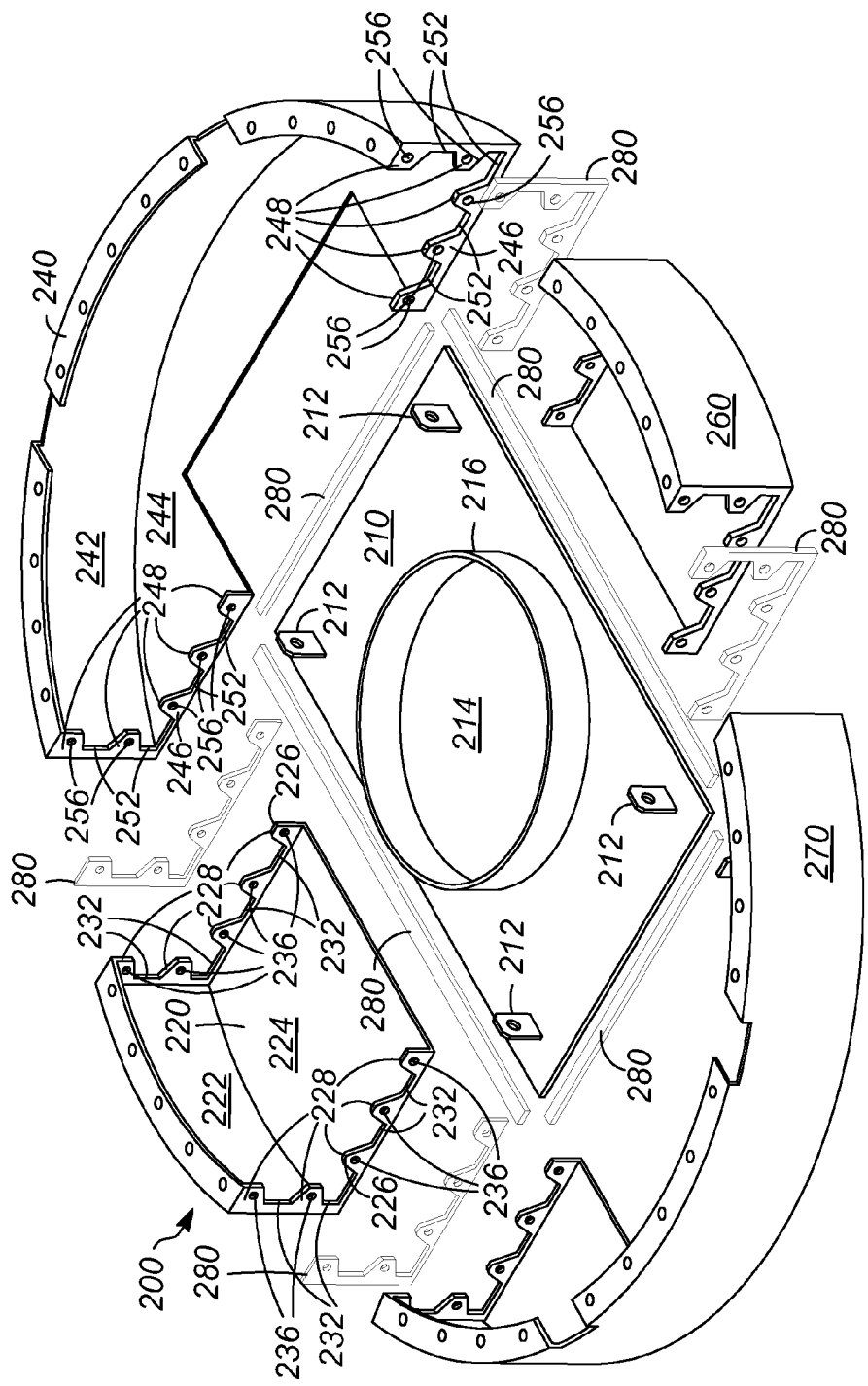
FIG. 2 is an exploded view of an exemplary mixing chamber.
Figure 3:
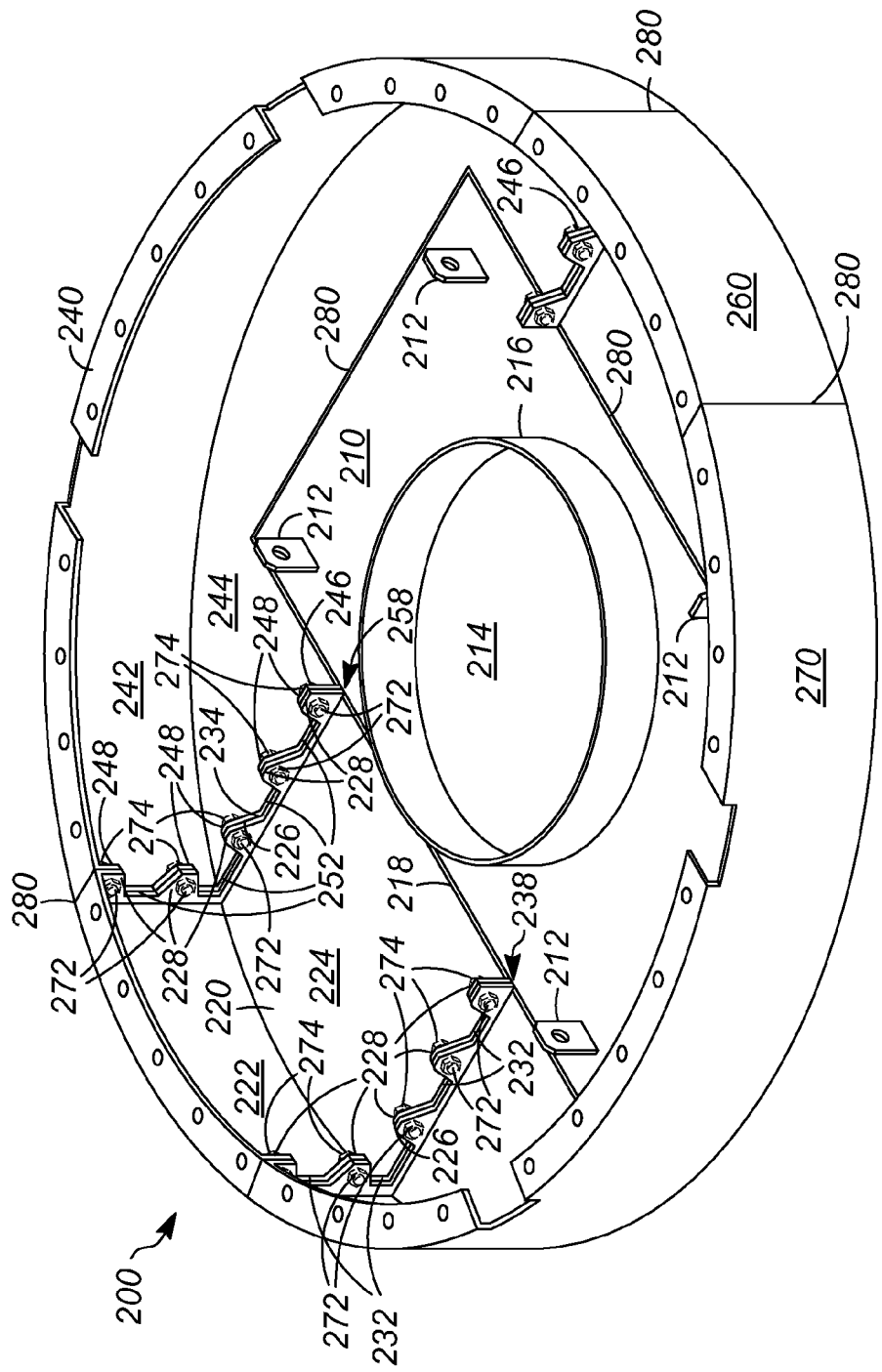
FIG. 3 is a perspective view of the exemplary mixing chamber.

Referring to FIGS. 2-3, the exemplary mixing chamber 200 is depicted. As an aside, some elements, such as holes, flanges, and other parts are not numbered in these figures, particularly FIG. 3, so as to not unduly clutter the drawings. The mixing chamber 200 can be any suitable shape, and is typically a right circular cylindrical chamber with shallow sides or sidewalls. The mixing chamber 200 can have any suitable number of sections, such as three to ten sections, and in this exemplary embodiment has five sections. Particularly, the mixing chamber 200 can have a first section 210, a second section 220, a third section 240, a fourth section 260, and a fifth section 270. Generally, the sections 220 and 260 and sections 240 and 270 can be substantially identical. As a consequence, only the sections 220 and 240 will be described in further detail hereinafter. The first section 210 can be rectangular, include a plurality of flanges 212, namely four flanges 212, and form an opening 214. Preferably, the opening 214 is circular. A weir 216 can surround the opening 214 to allow the collection of liquid on the surface of the first section 210 and inside the mixing chamber 200.

The second section 220 can include a sidewall 222 formed integrally and substantially perpendicular with a floor 224. Generally, a flange 226 can be formed along the edges of the sidewall 222 and the floor 224. Preferably, the flange 226 forms a series of teeth 228 with valleys 232. Each tooth 228 can form a respective hole 236. Hence, the flange 226 can be formed on both edges of the sidewall 222 and the floor 224.

Generally, the third section 240 includes a sidewall 242 formed integrally and substantially perpendicular with a floor 244. Generally, a flange 246 is formed along the edges of the sidewall 242 and floor 244. Preferably, the flange 246 forms a series of teeth 248 separated by valleys 252. Each tooth 248 can form a respective hole 256. Hence, the flange 246 can be formed on both edges of the sidewall 242 and the floor 244. Generally, the flanges 226 and 246 can be aligned to form a baffle 258, preferably toothed, as depicted in FIG. 3, and fastened together, using any suitable mechanism, such as welds or mechanical fasteners, e.g., a bolt 272 and a nut 274 with a gasket 280 there-between, as hereinafter described, inserted into a seam 234. If the bolt 272 and the nut 274 are utilized, usually respective bolts are inserted into holes 256 and secured with respective nuts. The aligned teeth 228 and 248 can impart a turbulent mixing to the one or more fluids swirling therein. Although the baffle 258 is depicted as having two flanges 226 and 246, it should be understood that the baffle may only include a single flange and the second and third sections 220 and 240 can be coupled together by other means, such as welds, optionally without the gasket 280 in the seam 234.

The gasket 280 can be positioned between the sections 210, 220, 240, 260, and 270. In this exemplary embodiment, the gasket 280 has eight pieces. However, the gasket 280 may include any suitable number of pieces, and as an example, in another exemplary embodiment may form a single piece formed integrally together. The gasket 280 can include any suitable material, such as one or more glass fibers of alumina-silica ceramic fiber; alumina, silica, and chromium oxide fiber; and/or alumina, silica, and zirconia fiber. The gasket 280 material can be a ceramic fiber of low-medium density of no more than typically about 570 kg/m$^3$, preferably about 240-about 330 kg/m$^3$. Usually, the gasket 280 can either be made of a blanket-felt or woven textile of glass fibers. Generally, the gasket 280 can have a thickness of no more than about 3 mm, with a compression thickness of no more than about 1 mm.

Hence, when the sections 210, 220, 240, 260, and 270 are coupled together using any suitable means, such as welds or mechanical fasteners, the gasket 280 can seal the mixing chamber 200 to prevent fluid leakage. If mechanical fasteners are utilized, coupling the sections 220, 240, 260, and 270 together can lock the first section 210 in place by applying mechanical pressure and friction along its edges at the gasket 280. Moreover, the flanges 226 and 246 can be aligned, as an example, with the sections respectively 220 and 240 to form toothed baffles 238 and 258 for promoting turbulent flow. Particularly, as one or more fluids enter the mixing chamber 200, they can swirl therein and interact with the teeth 228 and 248 formed at seams 218 and 234 to facilitate turbulent flow. The swirling can be created by spillways positioned on the collection tray 194. Exemplary spillways are disclosed in, e.g., U.S. Pat. No. 7,045,103 B2.

The toothed baffles or baffles 238 and 258 can be designed as a series of lugs that are v-shaped and notched out of a continuous piece of support material. Generally, the height of the baffles 238 and 258 is equal to or lower than the height of the weir 216. Usually, the baffles 238 and 258 are notched so as not to collect excessive liquid and hinder the swirling motion of the one or more fluids inside the mixing chamber 200.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of fabricating a mixing chamber in a hydroprocessing reactor, comprising:
   A) providing a first section forming an opening; and
   B) coupling a second section comprising a sidewall to the first section; wherein the second section forms a flange for coupling the mixing chamber and facilitating the mixing of one or more fluids.

2. The method according to claim 1, further comprising coupling a third section to the second section to form a seam.

3. The method according to claim 2, wherein the third section comprises a flange and the respective flanges of the second and third sections are formed along the seam for promoting turbulent fluid flow.

4. The method according to claim 3, wherein the second and third sections are fastened at the flanges using mechanical fasteners.

5. The method according to claim 3, wherein the second and third sections are fastened at the flanges using welds.

6. The method according to claim 3, wherein the respective flanges form a series of teeth for promoting turbulent flow.

7. The method according to claim 1, further comprising providing a weir surrounding the opening.

8. The method according to claim 2, further comprising providing a gasket comprising one or more glass fibers in the seam between the second and third sections.

9. The method according to claim 1, wherein the mixing chamber further comprises third, fourth, and fifth sections.

10. A mixing chamber comprising:
    A) a first section forming an opening surrounded by a weir;
    B) a second section coupled to the first section forming a first seam; and
    C) a third section coupled to the first and second sections forming a second seam with the second section; wherein a baffle is formed along the second seam for promoting mixing of one or more fluids therein.

11. The mixing chamber according to claim 10, wherein the mixing chamber further comprises a gasket in the seam between the second and third sections.

12. The mixing chamber according to claim 11, wherein the gasket comprises one or more glass fibers.

13. The mixing chamber according to claim 10, wherein the second and third sections are fastened at the flanges using mechanical fasteners.

14. The mixing chamber according to claim 13, wherein the mechanical fasteners comprise a bolt and a nut.

15. The mixing chamber according to claim 13, wherein the baffle comprises respective flanges of the second and third sections along the seam.

16. A reactor, comprising:
    A) a first catalyst bed;
    B) a collection tray positioned underneath the first catalyst bed; and
    C) a mixing chamber comprising:
       1) a first section forming an opening surrounded by a weir;
       2) a second section coupled to the first section forming a first seam; and
       3) a third section coupled to the first and second sections forming a second seam with the second section; wherein the second and third sections further comprise respective flanges along the second seam.

17. The reactor according to claim 16, wherein the mixing chamber further comprises a gasket in the seam between the second and third sections.

18. The reactor according to claim 17, wherein the gasket comprises one or more glass fibers.

19. The reactor according to claim 16, wherein the second and third sections of the mixing chamber comprise respective flanges along the seam for promoting turbulent fluid flow.

20. The reactor according to claim 19, wherein the flanges of the second and third sections form respective teeth.

* * * * *